United States Patent Office 3,148,949
Patented Sept. 15, 1964

3,148,949
METHOD OF PRODUCING CARBON BLACK
Richard C. Getoor, Huntington Woods, and Cleveland Walcutt, Jr., Birmingham, Mich., assignors to Ethyl Corporation, New York, N.Y., a corporation of Virginia
No Drawing. Filed Apr. 28, 1961, Ser. No. 106,156
5 Claims. (Cl. 23—209.4)

This invention relates to carbon black and more particularly to a novel method of producing excellent grade carbon black in high yields.

A majority of the carbon black currently produced is manufactured from natural gas by the so-called furnace process. This process has been developed to the point where now yields up to 35 percent are available. However, the process is still an "art" in that the same quality product cannot be consistently reproduced. Operating under apparently constant conditions, the properties of specific batches may vary to the point where they must be rejected or subjected to further processing to meet specifications. The blacks manufactured by this process are generally of the quality suitable for tire tread stock. Higher quality blacks are produced by the channel process but the yield for this process is only about 5 percent.

Suggestions have also been made to produce carbon black by "explosion" techniques. With these processes gaseous hydrocarbons are confined in a chamber and in the presence of an insufficient amount of oxygen for complete combustion are ignited. The energy released by the ensuing explosion is utilized in the formation of carbon black. However, these processes are batch-type operations with low yields and have never gained favor.

References can be found in the prior art suggesting the use of an internal combustion engine as a chemical reactor. These methods effect an incomplete combustion of low molecular weight hydrocarbons. A preformed mixture of the hydrocarbon and an amount of oxygen insufficient for complete combustion are fed to the engine and ignited. The reaction products of the incomplete combustion are intermediate oxidation products such as alcohols, aldehydes, ketones, etc. With some of the more specific processes a synthesis gas consisting predominantly of hydrogen and carbon monoxide is produced. In some instances carbon black may be produced as a by-product in yields of up to 4 or 5 percent.

To applicants' knowledge no process using an internal combustion engine to produce carbon black in sufficient amounts to make the process commercially competitive with present processes has ever been suggested.

It is an object of this invention to provide a new method for the economical production of carbon black. A further object is to provide a method of operating a reciprocating internal combustion engine whereby practically the entire products of the process are carbon black, and an effluent gas having heating value and concurrently mechanical energy is produced.

The process of this invention comprises the steps of introducing a primary fuel-air mixture into an internal combustion engine combustion chamber, compressing and igniting said fuel-air mixture thereby producing high temperatures, and in the substantial absence of oxygen, introducing under super-atmospheric pressure a secondary fuel into said combustion chamber whereby a reaction takes place resulting in high yields of carbon black, subjecting the resulting mixture to an essentially adiabatic expansion, and concurrently extracting mechanical energy. Based on the carbon content of the secondary fuel, yields in excess of 50 percent are obtainable. Thus, along with carbon black formation, a great percentage of the energy generated by the combustion of the primary fuel can be extracted from the engine as useable shaft power. Additional useful energy can be obtained from the process by utilizing the heat energy in the effluent exhaust gases for generation of power.

To effect the conversion of hydrocarbons to carbon black requires elevated temperatures. The exact mechanism is not clearly understood but it is believed that carbon black is formed by dehydrogenation of the parent molecule followed by formation of ring structures which nucleate and agglomerate to form carbon particles. At elevated temperatures the particles continue to grow beyond desirable size and, therefore, rapid cooling to stop particle growth is desired. The time of commencement and the rate of cooling is critical and to a large degree is controlling as to the yield, nature, and size of the carbon black particles.

The combustion chamber of an internal combustion engine is uniquely suited to provide the proper environment for carbon black formation. Not only are high temperatures and rapid temperature drops encountered but these variables can be easily controlled. Depending upon compression ratio, temperatures in excess of 5,000° F. can be obtained. Also by varying engine speed the proper rate of temperature drop can be controlled. Moreover, by varying the time of injection of the secondary fuel, the optimum residence time to achieve the desired products can be selected.

During the carbon black formation, it is essential that the reaction mixture be substantially free of oxygen so as to preclude the formation of undesirable partial and complete oxidation products. Thus, by operating an internal combustion engine under extremely rich conditions but in the presence of oxygen, as taught by the prior art, intermediate products such as carbon monoxide, hydrogen, alcohols, aldehydes and low yields of about 5 percent carbon black are produced. We believe that to a large measure such low yields are due to the long residence time of the hydrocarbon in the combustion chamber in the presence of oxygen. The hydrocarbon mixture is heated by compression and is further heated when the mixture is ignited. During this heating period, a variety of nonspecific reactions occur resulting in a multitude of products.

We have discovered that operating the engine in a very specific manner and under established conditions, the reaction in the engine combustion chamber is specifically directed toward the formation of carbon black. With this method much higher yields and a better grade carbon black are now obtainable.

According to this method the engine is operated using two separate and distinct fuels—a primary fuel and a secondary fuel. The primary fuel is used to operate the engine in the normal manner and provides a source of heat for the manufacture of carbon black and also for the generation of energy. This fuel is introduced into the combustion chamber in a conventional manner during the intake stroke. The secondary fuel rather than being introduced into the combustion chamber during the intake stroke is injected into the combustion chamber during a later time in the cycle. In the substantial absence of oxygen, the secondary fuel decomposes to form carbon black. The engine continues its normal cycle, the combustion gases undergoing a substantially adiabatic expansion wherein they are cooled, and shaft power is extracted from the process. The gases and the formed carbon black particles are exhausted through the exhaust port. By conventional means such as cloth filler bags, electrostatic precipitators, centrifugal cyclone collectors, etc. the carbon black is separated from the gases and collected. The gases may then be subjected to further combustion in a furnace and additional energy extracted therefrom.

The primary and secondary fuels may be the same but oftentimes and especially for economical reasons are different. In any event the fuels are always introduced into the combustion chamber at different times and usually through different delivery lines.

The primary fuel is introduced into the combustion chamber in the normal manner; that is, in the case of a gasoline engine through the carburetor wherein it is vaporized, mixed with air and, through the manifold, delivered to the cylinder. Similarly, if the engine is of the compression ignition type, the primary fuel in the normal manner is injected into the compressed air, and for a gas engine the gas-air mixture, properly metered, is delivered to the combustion chamber. In any event upon ignition of the fuel-air mixture extremely high temperatures are generated. Maximum temperatures are generally obtained at about the time the flame has completely consumed the fuel, which in most instances is coincidental with the piston approaching top center on the compression stroke. At this point in the cycle, the fuel-air mixture has completely reacted and the combustion gases are substantially free of reactive oxygen.

As previously stated, the residence time for carbon black formation has a significant effect on product yield and quality. Since cooling, which tends to stop particle growth, begins with the commencement of the expansion stroke, the effective residence time is largely determined by the time at which the secondary fuel is introduced into the combustion chamber. We have found that the optimum time to introduce the secondary fuel into the combustion chamber is during that time interval from slightly prior to slightly after obtaining peak temperatures. This may be from about 20° before top center (B.T.C.) of the compression stroke to about 10° after top center (A.T.C.). The most preferred time of injecting the secondary fuel for maximum carbon black yield is from about 15° B.T.C. to about top center of the compression stroke. After peak temperatures are reached, and the piston begins its downward travel on the power stroke, the gases undergo an essentially adiabatic expansion. In the adiabatic expansion process, the system neither loses nor gains heat. The gas temperature and pressure falls as energy is converted to external work. The process in the internal combustion engine cycle is not completely adiabatic, for some energy is lost due to cooling through the cylinder walls. It is understood that the term will hereinafter be used to denote the practical process which in actuality is substantially but not completely adiabatic.

For a given engine the rate of temperature fall of the gasses during the adiabatic expansion is largely controlled by engine speed. Thus, operating at 900 r.p.m., temperatures drop from a peak of about 5,000° F. at top center to about 1200° F. at the end of the expansion stroke when the gases are exhausted. This represents an average rate of temperature drop of about 200° F./millisecond. By varying the engine speed, the rate of temperature drop can be controlled. For example, operating the engine at 450 r.p.m., temperature drops of about 100° F./millisecond are encountered while operating at 2,000 r.p.m., temperature drops of over 500°/millisecond are obtained. We have found that good yields of an excellent grade of carbon black are obtained when the rate of temperature drop is from about 100 to 600° F./millisecond. For maximum yield and optimum carbon black quality, operating the engine so as to obtain a rate of temperature drop from about 200 to 400° F./millisecond is preferred.

Another variable is the ratio of secondary to primary fuel. Generally, this ratio should be in the range of from about 0.5 to 2.5 pounds of secondary fuel per pound of primary fuel. Using a lesser amount of secondary fuel adversely affects the economics of the process, while using a greater amount results in a reduced yield. We prefer to operate under conditions such that the secondary-to-primary fuel ratio is from about .85 to 1.50.

The compression ratio of the engine has been found to have a significant effect on carbon black yield. High yields of carbon black are obtainable at compression ratios in the range of from about 4:1 to 9:1. Compression ratios from about 5.5:1 to 7.5:1 are especially preferred.

Operating the engine according to the method of this invention enables us to control the environment under which the decomposition of the secondary fuel to form carbon black takes place. By varying engine parameters yield and quality of carbon black can be optimized. Variables such as primary fuel-air ratio, the time of injection of the primary charge, and the composition and time of injection of the secondary fuel are independent variables and can be individually altered. In other words, parameters affecting the combustion of the primary fuel can be altered without affecting the amounts or composition of the secondary charge from which the product will be derived. This is in contrast to the prior art teachings of using an engine as a chemical reactor wherein a preformed mixture is used to operate the engine and is also the source of the desired chemical product. With such methods a change in any of the variables enumerated above has an effect on both the combustion chamber environment and that fuel portion from which the product is to be derived.

Another advantage of our method is that engine and fuel variables can be controlled so as to maximize either carbon black formation or available shaft power or a compromise between these two as the demands of the moment may dictate.

In carrying out the process it is not necessary to use pure oxygen but air can be employed. A sufficient amount of oxygen must be present to generate the desired temperature levels. The primary fuel-air ratios should be such that substantially all the oxygen reacts with the primary fuel. This provides an essentially oxygen-free environment for the decomposition of the secondary fuel to form carbon black. The presence of large amounts of reactive oxygen during the carbon black formation is undesirable for it tends to promote reactions yielding oxygenated products and reduces carbon black yield. We have found that if the primary fuel-air ratios are such that no more than about 5 percent excess oxygen is present, high yields of good grade carbon black are obtainable. However, we prefer to use primary fuel-air mixtures closer to stoichiometric and in a preferred embodiment, we use stoichiometric mixtures or mixtures slightly deficient in oxygen. This results in essentially complete combustion of the primary charge with the release of maximum amounts of energy and also provides an essentially oxygen-free environment for the decomposition of the secondary fuel to yield carbon black.

The method of this invention can be carried out with any internal combustion engine including the gas, gasoline, and diesel type engines. Only slight alterations are required to incorporate the engine into this process. The only modification required is a means for the delivery of the secondary fuel into the combustion chamber. This can be accomplished by drilling a hole in the cylinder wall or the cylinder top and inserting therein the terminal portion of the secondary fuel line. An injector nozzle can be used to vary spray pattern of the secondary fuel into the combustion chamber.

The time of the secondary fuel injection is synchronized with engine speed such that the secondary fuel is introduced into the combustion chamber at the desired time. The secondary fuel is injected into the combustion chamber under a pressure varying from about 500 to 2,000 p.s.i. The injection pressure must be greater than the combustion chamber pressure which will vary according to compression ratio and ignition time.

The primary fuel may be any material capable of combustion in an internal combustion engine. This includes alcohols and other oxygen-containing organic compounds. However, because of considerations such as cost of the fuel, ease of operation, engine durability, etc., we prefer to use hydrocarbon fuels. This includes gases such as methane, ethane, propane, butane, etc., liquified petroleum gases, natural gas, pure liquid hydrocarbons such as pentane, hexane, heptane, octane, benzene, toluene, xylene, etc. Hydrocarbons within the gasoline boiling range can be used including single components or mixtures of straight run alkylate, catalytically cracked or refined material, polymer and isomerized components. Hydrocarbons heavier than gasoline such as kerosene, jet fuel, diesel fuel, residual fuel, can also be used. The choice of the primary fuel will be dictated by economic factors and the particular engine in use.

Our method has the advantage that the choice of the primary fuel is not in any way restricted or dependent upon its carbon black formation tendency. The objective in burning the primary fuel is to generate energy and provide an optimum environment for the conversion of the secondary fuel to carbon black. Thus, any fuel having the requisite properties for the operation of the specific engine in use can be employed as the primary fuel.

There is also wide latitude in the choice of the secondary fuel. Carbon black can be obtained from virtually all hydrocarbons. Thus, gases such as methane, ethane, propane, butane, natural gas, synthetic hydrocarbon gas streams, and liquids such as pentane, hexane, heptane, octane, nonane, decane, undecane, dodecane, etc. and even solids such as pentadecane, hexadecane, heptadecane, liquified by heat, can be used. The unsaturated analogues and isomers of the above-mentioned compounds can also be used. Hydrocarbons with an aromatic base are excellent materials as secondary fuels. Benzene, toluene, xylene, and higher substituted aromatic compounds are excellent materials as secondary fuels.

Hydrocarbons within the gasoline boiling range may be used as the secondary fuel including single components or mixtures of straight run, alkylate, catalytically cracked or refined material, polymer, and isomerized components. Hydrocarbons heavier than gasoline can be used including kerosene, jet fuel, distillate fuel, fuel oil, light and heavy gas oil, diesel fuel, residual fuel, etc. The relatively heavy bottom materials in the refining of crude oil to gasoline are excellent sources for a secondary fuel. Not only are these materials relatively inexpensive but oftentimes are rich in aromatic base hydrocarbons. Hydrocarbon products derived from the refining of coal tar can be used, especially those materials having an aromatic base.

Investigations have shown that volatility and hydrocarbon type of the secondary fuel material affect carbon black yield. Yields are maximized as aromaticity is increased and volatility decreased. Thus, aromatics such as benzene, toluene, xylene, etc. are preferred materials as secondary fuels. By the same token, high boiling materials such as diesel fuel, residual fuels are preferred to lower boiling materials of similar hydrocarbon type composition. Thus, in a preferred embodiment, we operate the engine in accordance with the method of this invention and use as a secondary fuel a liquid hydrocarbon characterized by having an API gravity of from about 10 to 40°.

An advantage of our method is that widely diverse materials can be used as the secondary fuel independent of the materials used as the primary fuel. With prior art methods, the same fuel is used as an energy source and as the source of carbon black. Thus, the choice of fuels from which carbon black can be obtained is restricted to those fuels on which the engine is capable of being operated. For example, because of volatility considerations, the gasoline or even the diesel engine could not satisfactorily be operated using residual fuel. Thus, these heavier fuels could not be used as a carbon black source. With our method, these heavier liquid hydrocarbons can be used as a carbon black source even in engines normally operating on gaseous fuels. In other words any combination of primary and secondary fuel is possible, thus affording maximum flexibility.

The following examples will serve to illustrate the method of this invention. The procedures to be described were carried out using a 4-stroke, single cylinder CFR spark-ignited internal combustion engine. The only modification in this otherwise standard engine was that provisions were made for a secondary fuel injection line. This was accomplished by drilling a hole large enough to receive the nozzle of the secondary fuel injector at a location in the combustion chamber wall where an uninterrupted spray pattern could be obtained. The secondary fuel is delivered by a Bosch pump at suitably high pressures to a Bosch 30–S injector nozzle fitted to the hole provided in the combustion chamber wall. The pump, synchronized with engine speed, was used to meter in the desired amount of secondary fuel at the proper time during the engine cycle. Provisions were made to sample the solid and gas exhaust products and to measure the shaft power generated by the engine.

EXAMPLE I

The above described engine was operated under the following conditions:

| | |
|---|---|
| Engine speed | 900 r.p.m. |
| Compression ratio | 4.0:1. |
| Primary fuel/air ratio | 0.069. |
| Inlet air temperature | 150° F. |
| Jacket temperature | 212° F. |
| Oil temperature | 140° F. |
| Primary fuel | Isooctane. |
| Secondary fuel | No. 2 diesel fuel. |

The spark timing to ignite the primary fuel-air mixture was adjusted so that the flame front completed its travel across the cylinder when the piston reached the uppermost limit of its travel or top dead center. In other words spark timing was set so that when the piston reached top center on the compression stroke, the flame had theoretically consumed all of the primary fuel. Under the engine conditions of this example, ignition timing was set at 28° before top center (B.T.C.). At various times after the ignition of the primary fuels, a separate volume of a secondary fuel equal to the volume of the primary fuel was injected into the combustion chamber at a pressure of 1000 pounds/square inch. The effect of the time at which the secondary fuel injection was started on carbon black yield is shown in the following table:

Table I.—*Effect of Starting Time of Secondary Fuel Injection on Carbon Black Yield*

| | | | |
|---|---|---|---|
| Starting time of secondary fuel injection, ° B.T.C | 18 | 15 | 10 |
| Yield, pounds of carbon black/gallon of secondary fuel | 1.9 | 2.3 | 2.0 |

These data indicate that the starting time of secondary fuel injection has a significant effect on carbon black yield. Under the conditions of this example, starting secondary injection at 15° B.T.C., a maximum yield of 2.3 pounds of carbon black/gallon of secondary fuel is obtained. The time to complete the injection of the secondary fuel is from about 10 to 15 crank-angle degrees and, therefore, it appears that maximum yield is obtained when the total secondary fuel is injected prior to completion of the compression stroke.

In this example, while the engine was operated in the conventional manner, i.e., without secondary fuel injection, an indicated horsepower of 3.8 was generated. Operating according to the method of this invention; that is, with secondary fuel injection and carbon black production, the indicated horsepower was 3.1. Thus, good grade carbon black is produced and over 90 percent of the power obtainable while operating in a conventional manner is recoverable.

EXAMPLE II

The compression ratio of the single cylinder engine was increased to 6.56:1 and operated under the conditions of Example I with but one exception. In order to have the flame front complete its travel at top center of the compression stroke, spark timing was adjusted so as to ignite at 25° B.T.C. The yields of carbon black at various starting times of secondary fuel injection are shown in Table II.

*Table II.—Effect of Starting Time of Secondary Fuel Injection on Carbon Black Yield*

| Starting time of secondary fuel injection, ° B.T.C. | 20 | 15 | 10 | 6 | 2 | 4 ATC [1] |
|---|---|---|---|---|---|---|
| Yield, pounds of carbon black/gallon of secondary fuel | 2.4 | 2.75 | 2.9 | 2.8 | 2.5 | 1.75 |

[1] After top center.

These data also show that a compression ratio of 6.56:1, secondary fuel injection has a significant effect on carbon black yield. At this compression ratio, starting the secondary fuel injection at 10° B.T.C., a maximum carbon black yield of 2.9 pounds/gallon of secondary fuel was obtained. Allowing about 10 crank-angle degrees for the completion of injection of the secondary fuel, maximum yields are obtained when the total secondary fuel is introduced into the combustion chamber prior to the piston reaching top center.

Operating the engine in the conventional manner, i.e., without secondary fuel injection, an indicated horsepower of 4.6 was generated. With secondary fuel injection and carbon black production, 3.9 horsepower—85 percent of that under normal operation—was generated.

EXAMPLE III

The compression ratio of the single cylinder engine was increased to 9.01:1 and operated under the conditions of Example I with the exception that spark timing was adjusted so as to ignite the primary fuel-air mixture at 15° B.T.C. Under these conditions the flame front completed its travel as the piston reached the top of the compression stroke. The yields of carbon black at various starting times of secondary fuel injection are shown in Table III.

*Table III.—Effect of Starting Time of Secondary Fuel Injection on Carbon Black Yield*

| Starting time of secondary fuel injection, ° B.T.C. | 14 | 9 | 4 |
|---|---|---|---|
| Yield, pounds of carbon black/gallon of secondary fuel | 2.2 | 2.3 | 1.95 |

These data confirm the data of Examples I and II in that (1) time of injection of the secondary fuel has a significant effect on carbon black yield and (2) maximum yields are obtained when the injection of the secondary fuel is substantially completed prior to the piston reaching top center on the compression stroke.

Operating the engine at this ignition timing in the conventional manner, i.e., without secondary fuel injection, an indicated horsepower of 4.8 was generated. With secondary fuel injection and carbon black production, 4.4 horsepower—92 percent of that under normal operation—was obtained. Thus, high yields of carbon black are obtainable at the expense of only about 10 percent of the power otherwise available.

EXAMPLE IV

In comparing the maximum yields obtained in Examples I, II and III, it is seen that compression ratio has a significant effect on carbon black yield. These values are compared in Table IV.

*Table IV.—Maximum Carbon Black Yields Obtained at Various Compression Ratios*

| Compression Ratio | 4.0 | 6.56 | 9.01 |
|---|---|---|---|
| Maximum yield, pounds of carbon black/gallon of secondary fuel | 2.3 | 2.9 | 2.3 |

These data illustrate the significant effect of compression ratio on carbon black yield and indicate optimum conditions to be at a compression ratio of about 6.5:1.

EXAMPLE V

The engine was operated under the optimum conditions for the maximum yield of carbon black as in Example II; that is, 6.56:1 compression ratio, 900 r.p.m., and ignition timing of 25° B.T.C., and the start of secondary fuel injection at 10° B.T.C. A variety of hydrocarbons were used as the secondary fuel and the carbon black yield obtained from each is as follows:

*Table V.—Carbon Black Yield From Various Hydrocarbons*

| Secondary fuel: | Yield, pounds of carbon black/gallon of secondary fuel |
|---|---|
| Heptane | 1.24 |
| Isooctane | 1.46 |
| Toluene | 2.63 |
| No. 2 diesel fuel (36° API gravity) | 2.90 |
| No. 6 residual fuel (12° API gravity) | 3.25 |

Thus, aromatic type hydrocarbons yield significantly higher quantities of carbon black than do saturate type hydrocarbons. As shown above, the aromatic toluene yields significantly larger quantities of carbon black than do saturates such as heptane and isooctane. No. 2 diesel fuel and No. 6 residual fuel, a mixture of saturates and aromatics, are much heavier hydrocarbons and carbon black yields are significantly greater than the much lighter saturates or aromatics.

EXAMPLE VI

The engine was operated under the optimum conditions for maximum carbon black production as in Example II. The ratio of the pounds of secondary fuel—No. 2 diesel fuel—to primary fuel—isooctane—was set at 0.85, 1.10, and 1.50. The yield of carbon black in each case was essentially constant. These data indicate that within these limits high yields of carbon black, independent of secondary-to-primary fuel ratio, are obtained.

EXAMPLE VII

The engine was operated in a conventional manner without secondary fuel injection and also under the optimum conditions for maximum carbon black production as in Example II. Investigations were conducted with the inlet air temperature at two levels—150° F. and 420° F. Carbon black yield and indicated horsepower while operating at the two temperature levels are as follows:

*Table VII.—Carbon Black and Indicated Horsepower as Affected by Inlet Air Temperature*

| | Engine operated with inlet air temperature at— | |
|---|---|---|
| | 150° F. | 420° F. |
| Yield, pounds of carbon black/gallon of secondary fuel | 2.9 | 2.75 |
| Indicated Horsepower: | | |
| Without secondary fuel injection | 4.6 | 3.7 |
| With secondary fuel injection and carbon black production | 3.9 | 3.0 |

Thus, increasing inlet air temperature from 150° F. to 420° F. lowered carbon black yield and also lowered the power obtainable from the engine.

EXAMPLE VIII

The engine was operated under the optimum conditions of Example II, using No. 2 diesel fuel as the secondary fuel. In addition to sampling the carbon black produced, the gaseous exhaust products were also analyzed. The material balance for carbon and hydrogen follows:

*Table VIII.—Carbon and Hydrogen Material Balance*

IN

|  | Pounds of Carbon | Pounds of Hydrogen |
|---|---|---|
| Primary fuel (isooctane) | 2.43 | 0.455 |
| Secondary fuel (No. 2 diesel) | 3.019 | 0.449 |
| Water vapor |  | 0.016 |
| Total | 5.449 | 0.920 |

OUT

|  | Pounds of Carbon | Pounds of Hydrogen |
|---|---|---|
| Carbon black | 1.43 | 0.0127 |
| Effluent gases | 3.72 | 0.379 |
| Organic solids | 0.76 | 0.0062 |
| Water |  | 0.377 |
| Total | 5,226 | 0.7749 |
| Percent Recovery | 97 | 85 |

Effluent gas composition: Volume percent
- Nitrogen --- 68.8
- Carbon monoxide --- 13.2
- Hydrogen --- 10.5
- Carbon dioxide --- 5.4
- Ethylene --- 0.2
- Oxygen --- 0.3
- Methane --- 0.3

The combustion of the effluent exhaust gas yields 83 B.t.u's per cubic foot.

EXAMPLE IX

The engine was operated as in Example VIII using No. 2 diesel as the secondary fuel. The properties of a typical sample were as follows:

*Table IX.—Analytical Properties of Carbon Black*

| | |
|---|---|
| Nigrometer scale | 91.0 |
| Oil absorption (cc./gram) | 1.37 |
| Tinting strength (percent SRF) | 193. |
| Benzene extract (percent) | 3.78 |
| Ash (percent) | 0.01 |
| Volatile (percent) (non-extracted black) | 4.37 |
| Volatile (percent) (extracted-dried black) | 1.61 |
| $N_2$ surface area (m.²/gram) | 55.5 |
| pH | 4.75 |
| Density (No./cu. ft.) | 6.4 |
| DPG (percent/gram) (of extracted-dried black) | 14.6 |
| Moisture (percent) | 1.5 |
| Sulfur (non-extracted black) | 0.08 |

The additional variable of engine speed and the pressure under which the secondary fuel was injected were investigated and found to have little effect on carbon black yield. However, indications are that engine speed may have an adverse effect on carbon black quality. At engine speeds much in excess of about 2000 r.p.m., the volatile content and acetone extractable constituents of the carbon black are increased.

While we have specifically described the production of carbon black in a 4-stroke spark-ignited internal combustion engine, it is to be understood that our method is not restricted thereto. The scope of this invention contemplates the use of a variety of reciprocating internal combustion engines. Thus, the engine may be of the spark-ignited or compression-ignited type and may operate on a 2 or 4-stroke cycle. The engine may be of the gas type; that is, wherein a gaseous material such as natural gas is used as the fuel, or of the type wherein a liquid hydrocarbon such as gasoline is the normal fuel, or of the diesel type wherein heavier liquid hydrocarbons are normally used as the fuel. These engines have in common combustion under pressure and high temperatures followed by an adiabatic expansion resulting in rapid cooling of the combustion gases. The time of ignition of the primary fuel may be controlled and the injection time of the secondary fuel to form carbon black can be controlled. In each case the type and amount of primary fuel used is independent of the type and amount of secondary fuel used in the process. Thus, by using our method maximum flexibility of operation is afforded. Primary and secondary fuels of widely divergent characteristics can be incorporated into the process.

Another advantage of this method is that operating conditions can be closely maintained and thereby obtain carbon black of substantially uniform composition during long and continuous operation. Because of its inherent nature, the conditions within an internal combustion chamber are much more uniform and easier to control as compared to a conventional carbon black producing furnace. The combustion state within a furnace is difficult to control and is dependent to a large extent on combustion chamber wall temperatures. In an engine with the exceedingly high combustion temperatures and the small amount of time available for diffusion, wall effects are greatly reduced. Thus, the carbon black produced during an internal combustion engine cycle will be of a homogenous nature. Moreover, during a continuous operation, the conditions within the combustion chamber can be reproduced from cycle to cycle, thereby assuring substantial uniformity in production quality.

Other materials, to function as catalysts, may be included in the primary or secondary fuel to increase carbon black yield and quality. Also, water injection into the combustion chamber during or after secondary fuel injection may be employed.

We claim:

1. A process for the simultaneous production of carbon black and mechanical energy which comprises mixing a primary hydrocarbon fuel and air in proportions such that the air is present in substantially the amount required for complete combustion of said primary fuel, introducing said primary fuel/air mixture into the combustion chamber of an internal combustion engine, compressing said mixture by means of a reciprocating piston, igniting said mixture in said combustion chamber, injecting, subsequent to ignition of said mixture but prior to the time said piston reaches 10° after top dead center of the compression stroke, a secondary hydrocarbon fuel into said combustion chamber at superatmospheric pressure, the ratio of said secondary fuel to said primary fuel being from about 0.5/1 to about 2.5/1 in terms of weight; whereby, in the substantial absence of oxygen, a reaction takes place to form carbon black from said secondary fuel, subjecting the resulting mixture to a substantially adiabatic expansion whereby the mixture is cooled, removing the carbon black from said combustion chamber, and converting the heat released by said adiabatic expansion into available mechanical energy.

2. The process of claim 1 wherein said secondary fuel is introduced into said combustion chamber subsequent to the ignition of said hydrocarbon fuel-air mixture but substantially prior to the completion of the compression stroke.

3. The process of claim 2 wherein said hydrocarbon fuel-air mixture is compressed to about ¼ to ⅛ its original volume.

4. The process of claim 2 wherein the ratio of said secondary fuel to said hydrocarbon fuel is from about 0.85:1 to 1.50:1.

5. The process of claim 4 wherein said secondary fuel is a liquid hydrocarbon characterized by having an API gravity of from about 10° to 40°.

References Cited in the file of this patent

UNITED STATES PATENTS

| 2,232,747 | Szeszich et al. | Feb. 25, 1941 |
| 2,690,960 | Kistiakowsky et al. | Oct. 5, 1954 |
| 2,909,416 | Herwig | Oct. 20, 1959 |

FOREIGN PATENTS

| 380,983 | France | Oct. 25, 1907 |
| 548,700 | Canada | Nov. 12, 1957 |